(12) United States Patent
Fraenkel

(10) Patent No.: US 7,307,356 B2
(45) Date of Patent: Dec. 11, 2007

(54) SUPPORTING STRUCTURES FOR WATER CURRENT (INCLUDING TIDAL STREAM) TURBINES

(75) Inventor: Peter L. Fraenkel, London (GB)

(73) Assignee: Marine Current Turbines, Ltd., Bristol (GB)

(*) Notice: Subject to any disclaimer, the term of this patent is extended or adjusted under 35 U.S.C. 154(b) by 57 days.

(21) Appl. No.: 10/536,261

(22) PCT Filed: Nov. 26, 2003

(86) PCT No.: PCT/GB03/05132

§ 371 (c)(1),
(2), (4) Date: Apr. 24, 2006

(87) PCT Pub. No.: WO2004/048774

PCT Pub. Date: Jun. 10, 2004

(65) Prior Publication Data
US 2006/0244267 A1   Nov. 2, 2006

(30) Foreign Application Priority Data
Nov. 28, 2002 (GB) .................... 0227739.0

(51) Int. Cl.
*F03B 13/10* (2006.01)
(52) U.S. Cl. ............... 290/54; 290/43; 415/3.1
(58) Field of Classification Search .......... 290/42, 290/43, 44, 53, 54, 55; 415/3.1, 4.1
See application file for complete search history.

(56) References Cited

U.S. PATENT DOCUMENTS

| | | | |
|---|---|---|---|
| 4,864,152 A | 9/1989 | Pedersen | |
| 5,440,176 A | 8/1995 | Haining | |
| 5,798,572 A * | 8/1998 | Lehoczky | 290/54 |
| 5,946,909 A | 9/1999 | Szpur | |
| 6,104,097 A * | 8/2000 | Lehoczky | 290/54 |
| 6,652,221 B1 | 11/2003 | Praenkel | |
| 6,856,036 B2 | 2/2005 | Belinsky | |

FOREIGN PATENT DOCUMENTS

| | | |
|---|---|---|
| GB | 204505 | 10/1923 |
| GB | 2311566 A | 10/1997 |
| GB | 2347976 A | 9/2000 |

* cited by examiner

*Primary Examiner*—Nicholas Ponomarenko
(74) *Attorney, Agent, or Firm*—Brinks Hofer Gilson & Lione

(57) ABSTRACT

A support system for a marine turbine installation including at least one turbine unit (3), the support system including a support column (1) or two or more support columns (1) which are arranged to be installed vertically, characterised by a turbine support assembly (2/14) including a horizontally arranged turbine support structure (4/15) adapted for displacement lengthways of the associated support column or columns, at least two turbine units (3) operationally carried by the support structure and means (41/44, 26/41, 52/55, 65/66) for enabling selective displacement of the support member (4, 15) lengthways of the associated column or columns, and in that the support structure includes an elongate member profiled in such manner that when the flow of water relative to the support assembly is bi-directional, the support structure member is so profiled so as to minimise water flow disturbance what ever the direction of the bi-directional water flow.

18 Claims, 15 Drawing Sheets

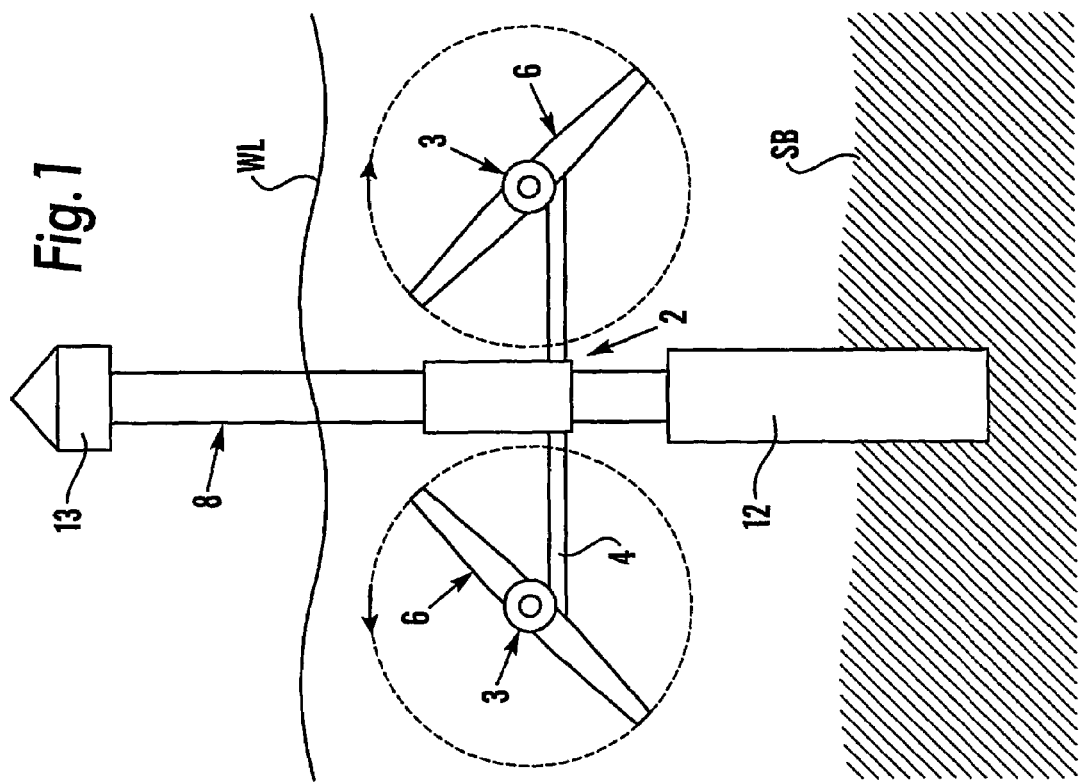
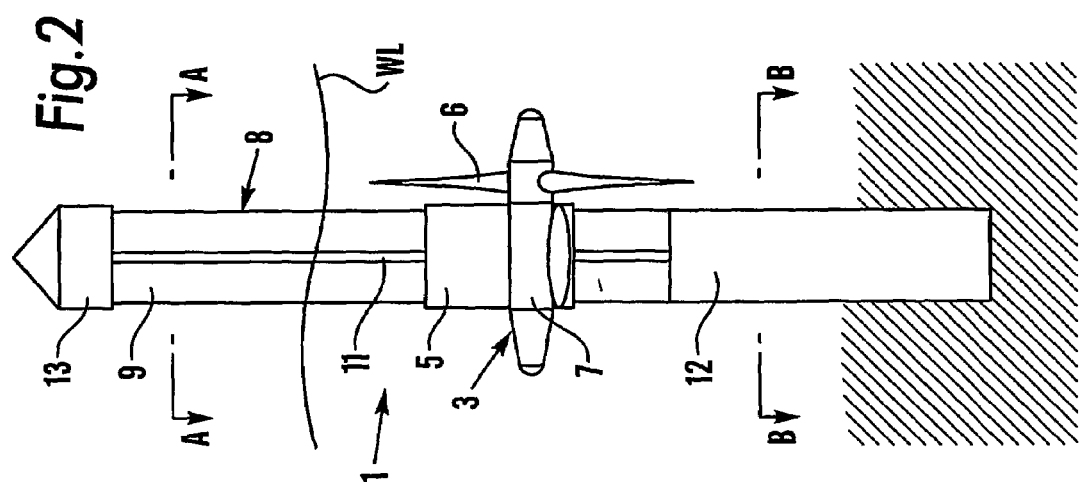
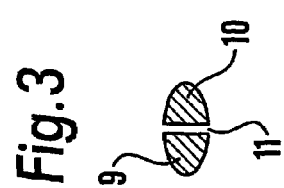
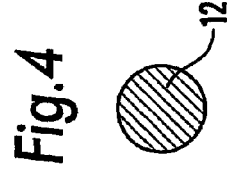

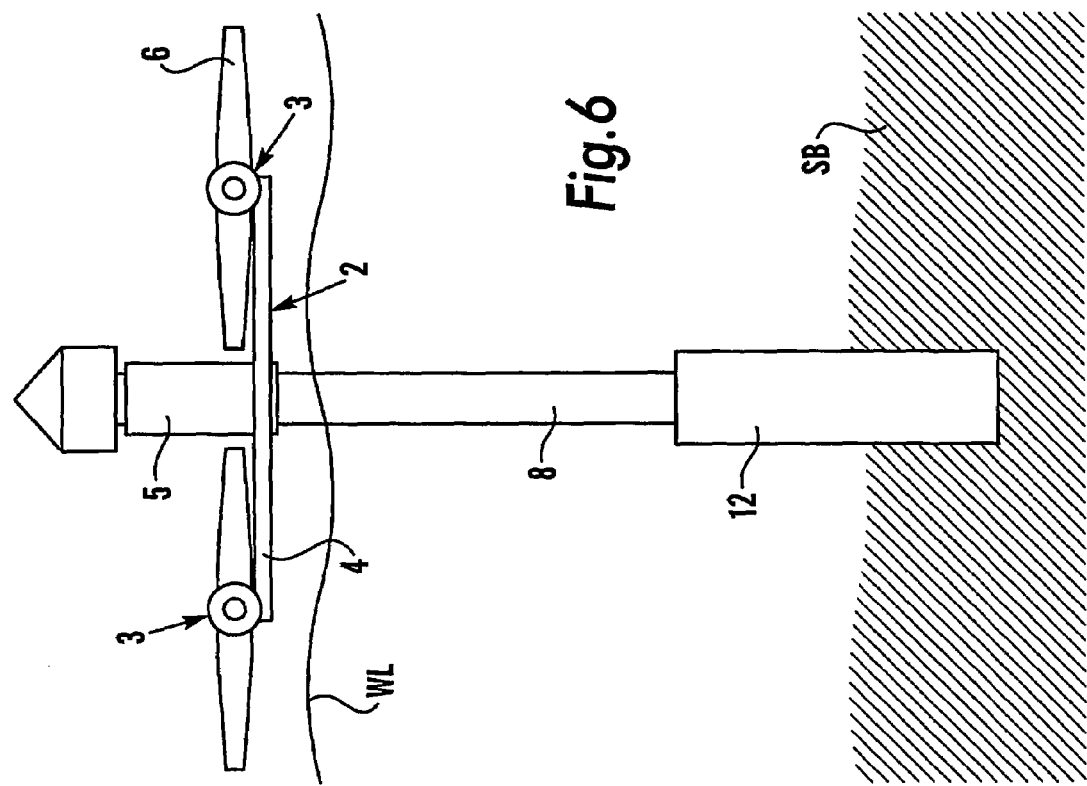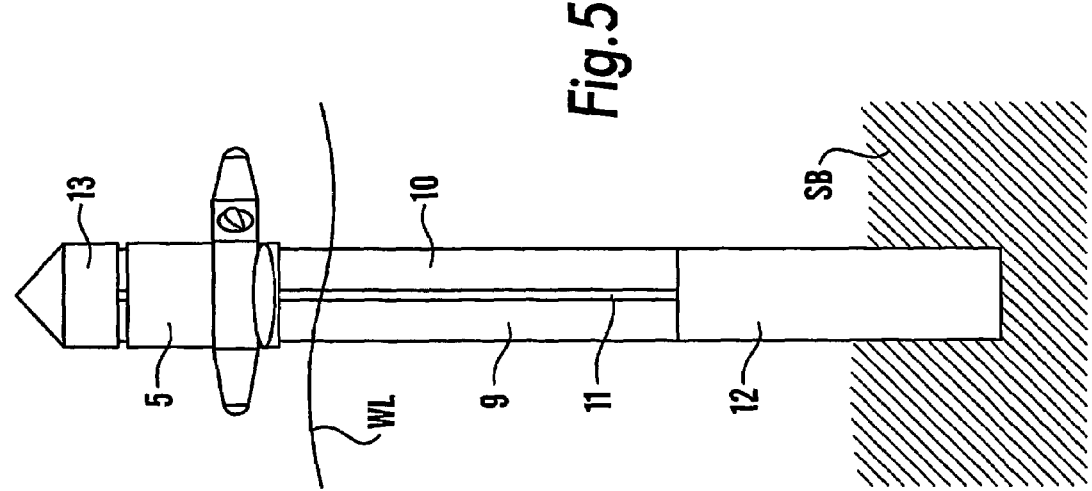

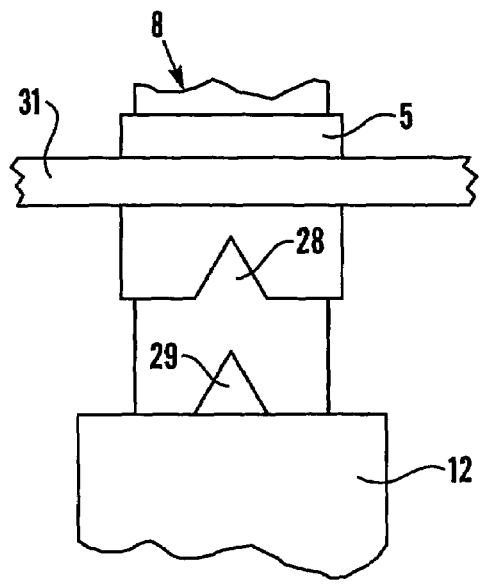
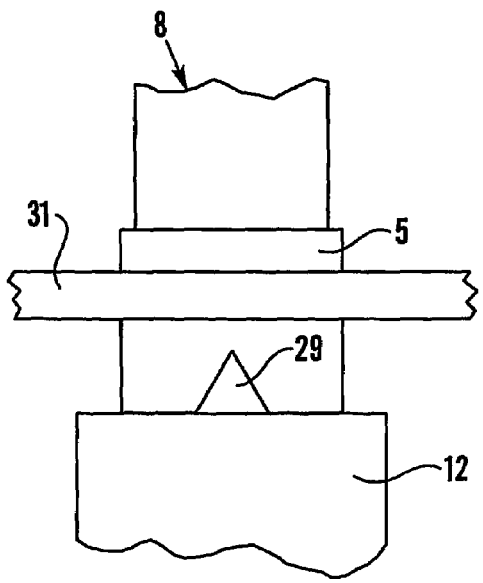
Fig. 14          Fig. 15
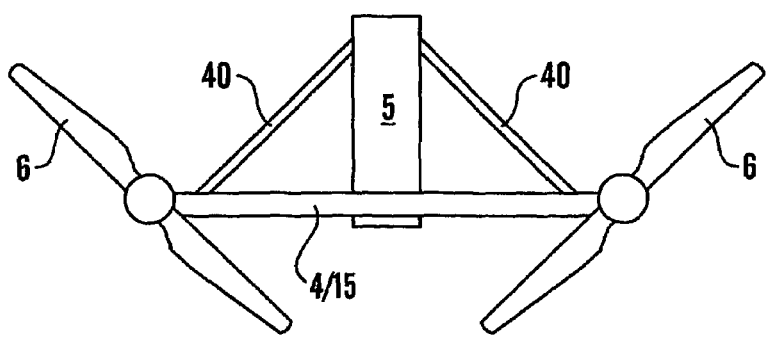
Fig. 16

SUPPORTING STRUCTURES FOR WATER CURRENT (INCLUDING TIDAL STREAM) TURBINES

BACKGROUND OF THE INVENTION

This invention relates to structures for supporting turbines, and more specifically for the support of turbines arranged to be immersed in a water current and driven by the kinetic energy of the flow of water.

In our British Patents GB 2256011 B, GB 2311566 B and GB 2348250 B we have disclosed constructions pertaining to water driveable turbines; i.e. rotors supported within the water column of the sea, river or an estuary so that the flow of water may turn the rotor to produce either electricity or shaft power for utilisation for a required purpose.

When a turbine is used in such a way that it is driven by a flow of water the extraction of energy from the flow causes reduction in momentum of the passing water which in turn causes large reaction forces on the turbine which manifest themselves primarily as a thrust force acting in the direction of the flow and proportional to the numerical square of the mean velocity through the rotor. This phenomenon is a consequence of the laws of physics and will occur regardless of the turbine rotor design. In all cases the thrust on the rotor will be in direct proportion to the product of the square of the mean velocity of flow through the rotor and of the swept area of the rotor.

In general, the more powerful and efficient the turbine rotor, the greater the forces that need to be resisted, although under certain conditions such as "run away" large thrust forces can be produced even when the turbine is not delivering much, or any, usable power to the shaft. This is of course a direct consequence of the fact that the forces needed to hold the rotor in position are the reaction to the forces transmitted to the turbine rotor in order to rotate it, which in turn give a measure of its efficacy for the generation of shaft power.

Therefore an essential requirement for any such turbine is for the rotor which extracts the energy to be held in position by a structure with adequate reserves of strength to resist the static and also the dynamic forces imposed on the rotor not only by the effect of extracting energy from the flow, but also from other effects that may in some cases apply, such as passing waves, runaway conditions or unusual loads applied during installation or recovery of the turbine or other components.

Provision of such a structure is complicated by a number of other general requirements, namely:
- the structure shall not unduly interfere with the flow of the water through the rotor due to the effect of the wake it will develop (or it would reduce the efficiency of the rotor),
- the structure should also be as economical to manufacture as possible in order to minimise the costs of the system,
- there needs to be some practical and cost-effective method for installing the structure in a location with strong currents
- there needs to be some practical and cost-effective-method for installing the turbine rotor or rotors on the structure and then for gaining access to the rotor or rotors in order to maintain and when necessary to replace or repair them.

OBJECTS OF THE INVENTION

It is an object of the present invention to provide structures capable of supporting one or more generally, two or more turbine rotors within the water column of flowing currents, whether they be at sea, in rivers or in estuaries, and which in various ways to be described meet the four aforementioned requirements

STATEMENTS OF THE INVENTION

Broadly according to an aspect of the invention there is provided a support system for a marine turbine installation including at least one turbine unit, the support system including a support column or two or more support columns which are arranged to be installed vertically, characterised by a turbine support assembly including a horizontally arranged turbine support structure, adapted for displacement lengthways of the associated support column or columns, at least two turbine units operationally carried by the support structure and means for enabling selective displacement of the support member lengthways of the a associated column or columns, and in that the support structure includes an elongate member profiled in such manner that when the flow of water relative to the support assembly is bi-directional, the support structure member is so profiled so as to minimise water flow disturbance what ever the direction of the bi-directional water flow.

Preferably the leading and trailing edges of the member what ever the direction of water flow there across are such as to minimise the development of water drag and water wake formation at the lengthways edges of the member in water passing across the member irrespective of water flow direction across the member.

Also preferably the horizontal width of said horizontal member is such that each turbine unit is mountable thereto a location sufficiently distant from the supporting column that the water wake associated with flow of water past the member does not seriously interfere with the flow of water through the rotors of the turbine units mounted to the member even when the rotors of said turbines are operating in a vertical plane downstream with respect to water current direction of the column Preferably, the minimum spacing of the centres of the turbine rotors when mounted to structure member is set at distance slightly greater than the diameter of the rotors of adjacent turbine units on the support structure.

In the case where the support structure is carried by a single column two turbine units are mounted to the support structure the turbine units are arranged symmetrically one on either side of the column such that they are orientated with their plane of cross-section normal to the flow of the water currents relative to the column and with their axes at least the equivalent of one rotor diameter plus twice the pile thickness apart.

When the support structure is carried by and bridges two spaced apart columns the turbine units are mounted between the columns.

Conveniently when the support structure is carried by and bridges two spaced apart columns the structure can project to either side thereof and a turbine unit is mounted to each projecting part and any additional turbine units are mounted to that part of the support structure located between the columns, and any additional turbine units are orientated with their plane of cross-section normal to the flow of the water currents relative to the column and with their axes at least the equivalent of one rotor diameter plus twice the column thickness apart.

Preferably the horizontal support structure is mounted to an associated column by way of a collar or sleeve that is slidably mountable to the associated column for lengthways displacement of the column whereby the support structure can be positioned so that the turbine units are either above the surface of the water or positioned within the water column to submerge the rotors to whatever depth is desired for effective operation.

In practice the operational position for the support structure may be fixed so as to position the rotors at an optimum depth or it may be variable to allow the rotor position to be varied for example to follow the rise and fall of the tide or to lower the rotors further in bad weather to minimise wave loadings.

In such case means are provided for locking the the support assembly in any selected position.

In the preferred constructions where bi-directional water flows are expected in order minimise the drag and the wake of the support assemblies in installations for use such bi-directional water flows whereby in one direction of said flows the support assembly is effectively upstream of the associated turbine units during the flow of water and the turbine units carried thereby are likely to be affected by the drag and wake of the support assemblies the thickness of the support structure is accordingly minimised.

Conveniently in order to retain/maintain the requisite strength and stiffness of the support structure when of reduced thickness streamlined bracing struts are provided to brace the support arrangement with respect to the remainder of the structure.

When the support assembly is carried by two spaced columns, the upper ends of the columns are bridged by a bridging means in such manner as to improve resistance of the assembly to static and dynamic loading Conveniently said bridging means is arranged to provide a conduit for control and power connections between the two columns and may also allow human access from one column to the next.

In practice, the columns are installed by drilling holes into the sea bed or by driving a pile like column base into the sea or river bed.

When a column receiving hole is drilled the associated column is lowered vertically into the hole, and means are provided for enabling an appropriate concrete to be pumped through pipes through the column so that the concrete can fill any small concentric space that may arise between the column and the surrounding soil or rock, the arrangement being such that when the concrete sets the column is then securely grouted into place.

In situations where a sea bed is soft or liable to crumble or collapse when bored, a concrete or steel sleeve is driven into the sea bed prior to inserting the column/pile and grouting it into place.

If considered necessary in any location of use each column is physically braced in its upright position by an associated bracing arrangement that is shaped and profiled in such manner as to reduce water flow disturbance.

Conveniently each such bracing arrangement includes a strut connecting the upper region of the associated column to an associated separate anchor point in the vicinity of the seabed.

Preferably each such strut is pin or equivalently jointed at its upper end to an anchor position on the associated column and at its other end to a second anchor point spaced from the column in such manner so as to establish a triangulated arrangement.

In a preferred construction strut is of oval or elliptical cross section and is aligned along the direction, of the water flow, so that its wake is enabled to impinge on the column rather than the turbine units rotors when the water flow is from the direction of the strut.

Preferably, the column is constructed from in lengthways sections fabricated from appropriately rolled steel plate, the fabrication being such that the whilst the external diameter of each such section is the same the wall thickness of the sections differs from section to section to accommodate bending forces at differing overall heights of the column, said thickness being the greatest in or near the seabed and less at higher levels.

In a preferred construction the sleeve used for mounting the turbine assemblies can be guided relative to the associated column by having carriers affording low friction, and/or non-corrodable pads made from bearing materials such as filled nylon which can slide on non-corrodable longitudinal rubbing surfaces fixed along the outside of the column— these can, for example, be stainless steel angle stitch welded to the column.

Preferably, the upper section of each column comprises two side by side generally D-shaped part columns profiled to provided an over elliptical form with a lengthways extending gap there between.

Conveniently friction reducing means are provided for deducing resistance to movement between the column upper section and the support assembly during the displacement thereof relative to the column.

In a preferred construction the system includes an arrangement for displacing a turbine assembly lengthways of the associated column, the arrangement including cables, chains or the like connection with the support assembly and winches arrangements provided at the top of the associated column, with the run for the lengths of cables chains or the like connecting with the support assembly being located within said gap.

Conveniently the gap between the part columns is also utilised as the run for electrical power and instrumentation cables together with any hydraulic or pneumatic hoses provided for the control and servicing of the turbine units between the support assembly and the upper region of the associated column.

In a particular arrangement for displacing the support assembly, the latter is provided with a cross head enterable into said gap and arranged for connection to the cables, chains or the like provided for displacing the assembly lengthways of the column In practice the the interior of the gap would be from water flow action and ingress of foreign bodies by flexible panels extending lengthways of the column parts, the panels being are adapted for being forced apart by the support assembly during displacement thereof lengthways of the column.

In an alternative construction the support assembly displacing means includes rigid leg or strut extending length ways of the gap has its lower end attached to the support assembly, there being means are provided for displacing the leg or strut lengthways of the gap.

Conveniently, the displacing/lifting means includes a rack and pinion drive arrangement or hydraulic or pneumatic ram arrangements.

The displacing/lifting means is arranged to displace the support assembly in a stepwise manner, there being means for locking the support assembly against displacement at the end of each step.

In an alternative construction the means for enabling selective displacement of the support assembly includes external struts extending lengthways of the upper section of the associated column, with the lower ends of the struts connecting with the support assembly, means being provided for producing relative movement between the struts and the upper section for displacing the support assembly lengthways of the column to position the support assembly in a required position.

Conveniently, in situations where a sea bed is soft or will crumble or collapse when bored, a concrete or steel sleeve can be driven into it prior to inserting the column/pile and grouting it into place.

Conveniently the horizontal width of said horizontal member is such that the turbine rotors may be attached to each extremity of the horizontal member and are held securely, but far enough from the pile that the wake of the pile does not seriously interfere with the flow of water through the turbine rotors even when said turbine rotors are operating in a vertical plane downstream of the pile where the wake may be typically twice the thickness of the pile the arrangement being such that the minimum spacing of the centres of the turbine rotors when mounted to the member will be positioned at approximately the turbine rotor radius plus the pile thickness from the centre line of the pile the arrangement being further such that in the case where two turbine rotors are to be deployed, they are arranged symmetrically on either side of the pile such that they are orientated with their plane of cross-section normal to the flow of the currents and their axes at least the equivalent of one rotor diameter plus twice the pile thickness apart.

BRIEF DESCRIPTION OF THE DRAWINGS

For a better understanding of the invention and to show how to carry the same into effect reference will now be made to the accompanying drawings in which:

FIG. 1 is a schematic front elevation of a turbine unit support assembly mounting two turbine units when the turbine units carried thereby are positioned with their rotors submerged;

FIG. 2 is a schematic side elevation of a turbine unit support assembly of FIG. 1;

FIG. 3 is a section on the line A-A of FIG. 2;

FIG. 4 is a section on the line B-B of FIG. 2;

FIG. 5 is a schematic side elevation of a turbine unit support assembly of FIGS. 1 to 4, when the turbine units carried thereby are positioned with their rotors above the surface of the sea;

FIG. 6 is a schematic front elevation of a turbine unit support assembly of FIGS. 1 to 4 when the turbine units carried thereby are positioned with their rotors above the surface of the sea;

FIGS. 14 and 15 schematically illustrate an arrangement for locking a turbine unit support assembly against vibration or movement when it is at its lowest point of travel, the FIG. 14 illustrating the operationally disengaged position and the FIG. 15 illustrating the operationally engaged position;

FIG. 16 schematically illustrates in front view an arrangement for stiffening the turbine unit support assembly with respect to its supporting column;

DESCRIPTION OF THE PREFERRED EMBODIMENTS

Figure 7:
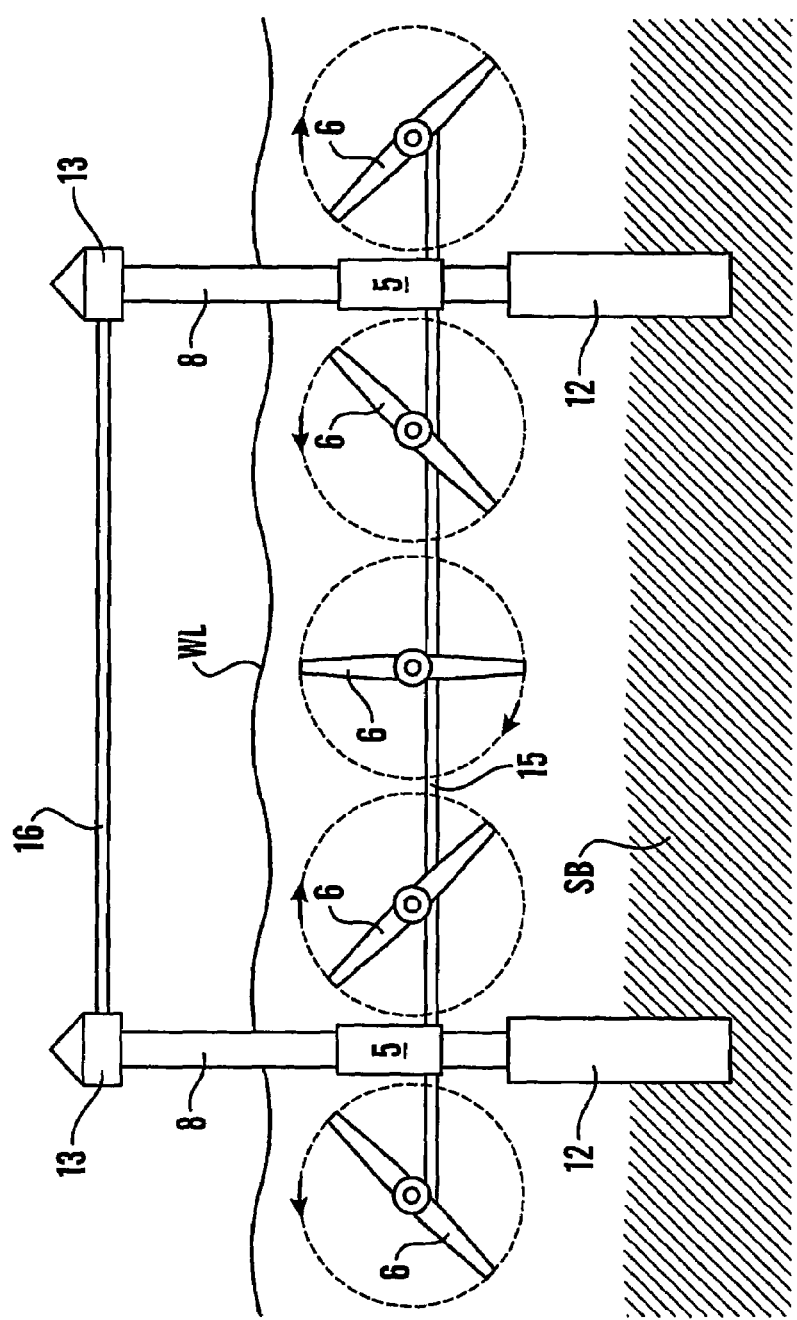
FIG. 7 is a schematic side elevation of a turbine unit support assembly mounting five turbine units when the turbines carried thereby are positioned with their rotors submerged.
Figure 7A:
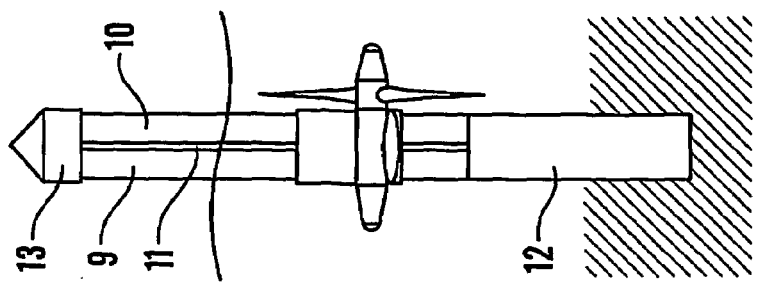
FIG. 7A is a schematic side elevation of the turbine unit support assembly of FIG. 7.

Referring now to FIGS. 1 to 4. These Figures illustrate a support column 1 for mounting a turbine assembly 2. The lower end of the column 1 is embedded in a river/seabed SB and is of such length that the upper end thereof is above water level WL. In the FIGS. 1 to 4 the turbine assembly is shown as comprising two turbine units 3 mounted one to each of the extremities of a horizontal wing-like support structure 4 including an internal spar (not separately shown) within an outer housing (not separately shown) streamlined in cross section. The structure 4 is carried by a collar like sleeve 5 longitudinally displaceable lengthways of the support column 1. the profiling of the structure 4 is such as to assist in reducing as far as possible the creation of undesirable water drag effects in water passing over the surface of the structure and to minimise the water wake at the trailing edge of the structure. in practice the direction of water flow across the structure can be tidal and thus reversible in direction across the structure. This requires that the profiling of the structure likewise being bi-directional so that it is operationally efficient in both directions of water flows.

Each turbine unit 3 includes a rotor 6 carried by a rotor shaft (not separately shown) that forms part of a very schematically indicated rotor rotation transmission system 7 including a drive-train (not shown) The drive-train is essentially a mechanism for applying the rotor shaft power for some useful purpose i.e., to generate electricity and may consist of a gearbox and generator, a direct drive generator or an hydraulic pump driving a generator via a hydraulic motor.

The sleeve 5 fits sufficiently closely to the upper section 8 of the column 1 as to be selectively displaceable lengthways of the column as will be considered hereinafter. The upper section 8 of the column is also streamlined by being of an overall oval/elliptical profile so as to minimise the water flow wake and to maximise the resistance to bending in the directions of water flow normal to the rotor plane.

In the embodiment of the system illustrated, the upper section 8 of the column comprises as shown in FIG. 3 two face to face twin "D" profiled part columns 9 and 10 with a gap 11 between them through which the main spar of the support structure 4 can fit.

The sleeve 5, the structure 4, and the turbine units 3 are assembled together as a composite unit to form the assembly 2. This assembly is displaceable bodily lengthways of the upper section of the column by sliding the sleeve 5 up or down the upper section 8 of the column 1. The section 8 is of such length that the extent of possible displacement enables the assembly 2 to be positioned below water level WL as is shown in FIGS. 1 and 2 and positioned above water level as is shown in FIGS. 5 and 6 so that the assembly 2 can be conveniently positioned with the rotors 6 in a stopped setting for the purposes of maintenance or other activities to be carried out upon the assembly.

In FIGS. 1 and 2 the assembly 2 is shown as being located with the axes of the turbine unit rotors 6 positioned approximately halfway between the water surface WL and the seabed SB.

It will be noted from the FIG. 4 section on the line B-B of FIG. 2 that the lower or base section 13 of the column is of a solid circular cross-section.

A housing 13 is provided at the upper end of the columns 9 and 10.

FIGS. 7, 7A, 8 and 8A illustrate how a turbine assembly 14 incorporating five turbine units 3 can be mounted in a manner similar to that discussed in relation to the turbine units of FIGS. 1 to 6 by means of a single support structure 15 similar in construction to that of Structure 4 that is in turn supported by two columns 1 similar in construction to those illustrated in FIGS. 1 to 6. It will be noted that the support structure 15, as with the previous embodiment, mounts a turbine unit 3 at each of its extremities together with a further three turbine units 3 along the length of support structure 15 intermediate the two associated columns 1. The two columns 1 can if desired be bridged by a bridging member 16 provided between the upper regions 18 of the column upper sections 8. Since the construction of these two columns 1 is similar that previously discussed further description of the columns is not thought necessary.

Figure 8:
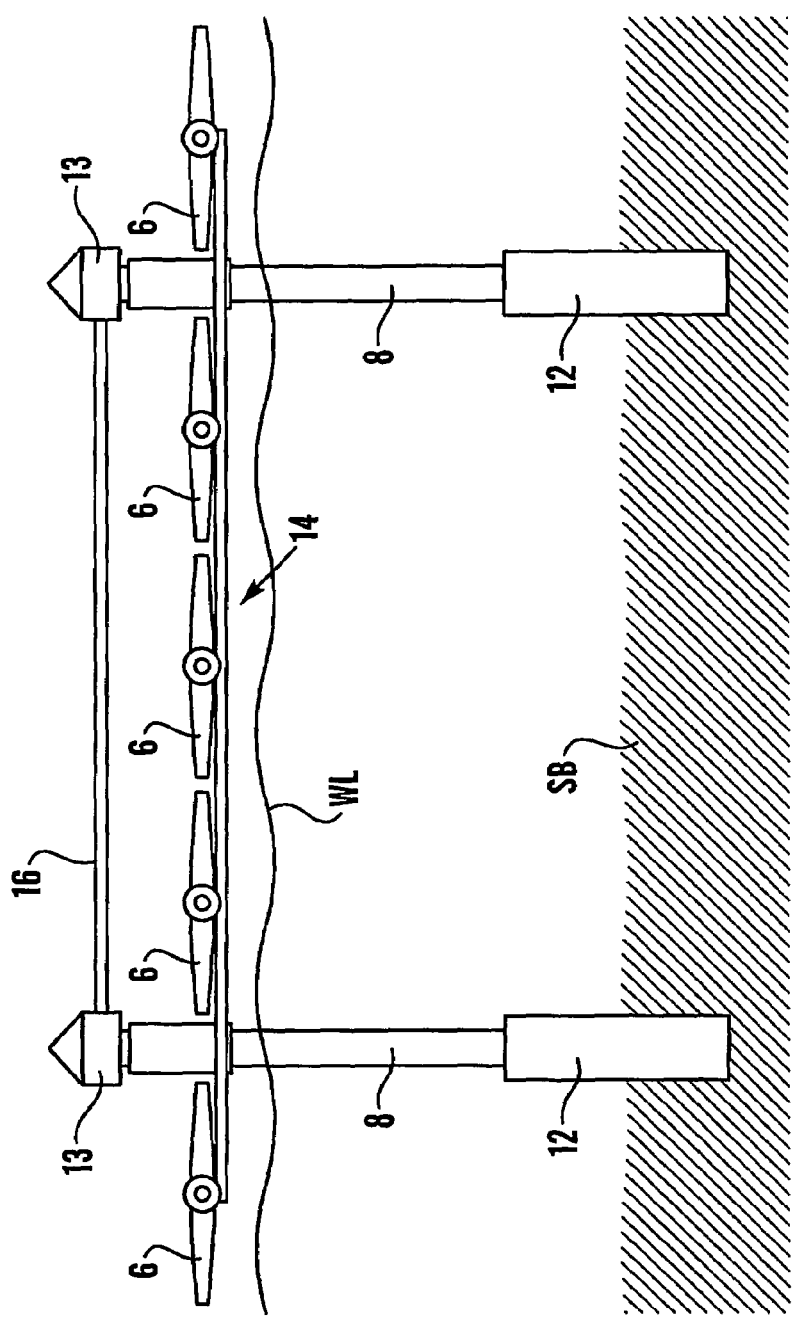
FIG. 8 is a schematic front elevation of a turbine unit support assembly of FIG. 7 when the turbine units carried thereby are positioned with above the water level.
Figure 8A:
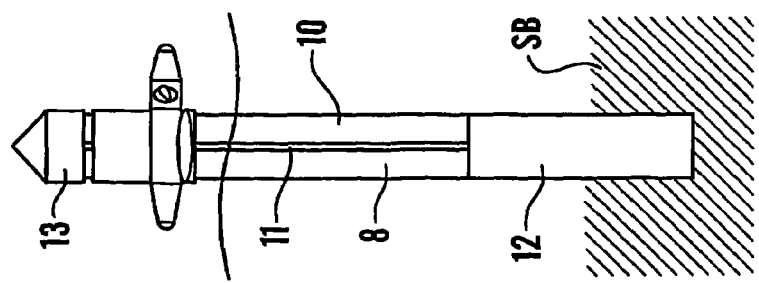
FIG. 8A is a schematic side view of the turbine unit support assembly of FIG. 8.

It will be appreciated that with the double column arrangement of FIGS. 7 and 8 movements of the support structure 15 relative to the two supporting columns needs to be carried out at a similar rate from each column by a synchronised lifting arrangement so as to maintain the support structure essentially horizontal.

A prime purpose of the bridging member is to improve the resistance of the structure 15 and associated columns 1 to static and dynamic loadings on the structure and columns. An advantage of this arrangement is that, in the example illustrated, it is possible to install 5 turbines on two piles instead of four, as would be the case with the system shown in FIG. 1. Therefore the system illustrated in FIGS. 7 and 8 has 25% more generating capacity then would apply if two of the systems in FIGS. 1 to 4 were used, yet it is possible the system of FIGS. 7 and 8 will cost less than 25% more than the system as in FIGS. 1 to 4 to manufacture and install. In other words the system of FIGS. 7 and 8 may be more cost-effective in certain circumstances.

Figure 9:
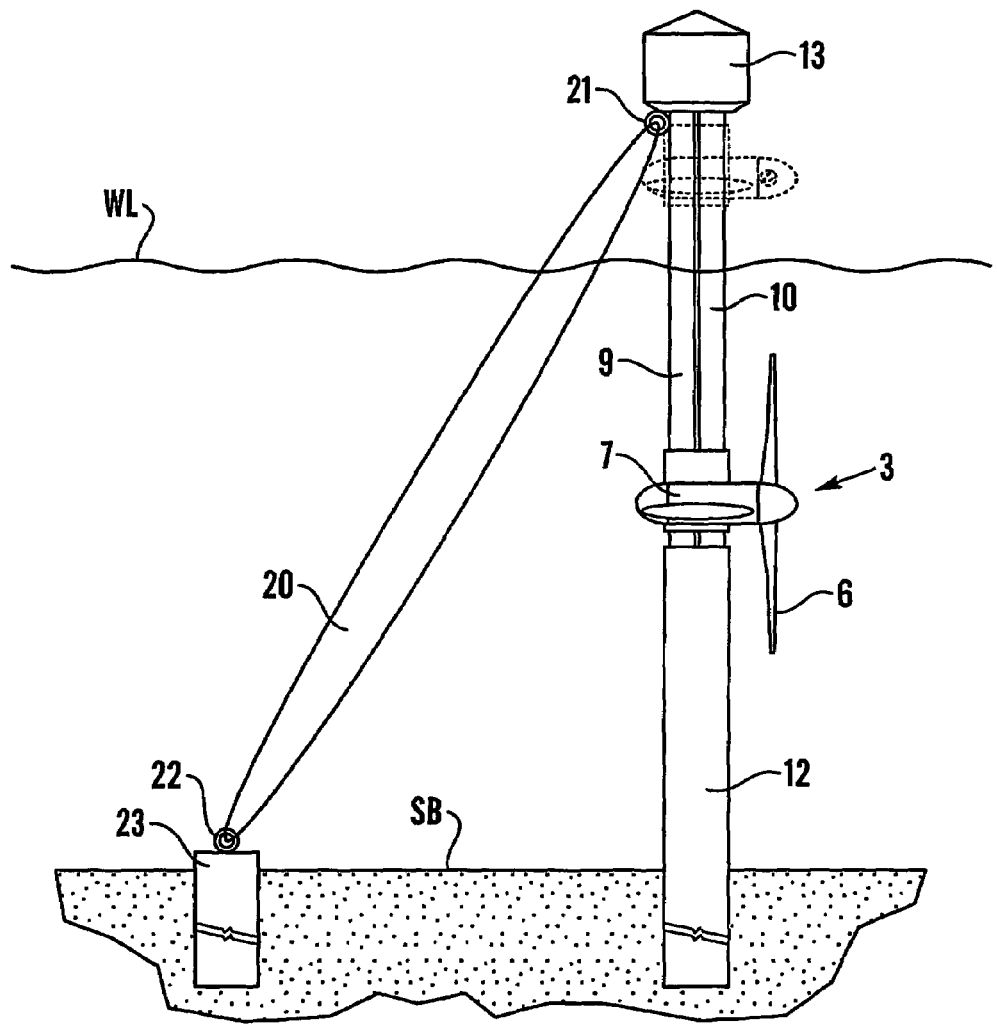
FIG. 9 schematically illustrates in side elevation a turbine unit support assembly suitable for use in a situation where the depth of water is too great to allow a cantilevered single column to be used reliably.

Referring now to FIG. 9 which indicates how in a situation where the depth of water is too great to allow a single column to be used reliably, it is possible to apply a streamlined strut 20 connecting between an anchor point 21 adjacent to the top of the column 1 and an anchor point 22 located at the top of a a pile 23 driven or other wise established in the sea bed SB. This arrangement provides a triangulated structure whose anchor points 21,22 can comprise pin joints at the respective anchor points 21 and 22. This arrangement stabilises the column 1 both in terms of static load and in terms of increasing its natural frequency to avoid resonance problems. The strut 20 is of oval or elliptical cross section such that it presents a narrow profile to the flowing current. It is also aligned along the direction of the current relative to the column so that its water flow wake impinges on the column rather than the turbine unit when the flow is from the direction of the strut 20. The strut arrangement of FIG. 9 may be used either to brace a single column carrying twin rotors as in FIGS. 1 and 2, or where twin columns are in use to support a row of turbines as in FIGS. 5 and 6 to brace both columns. The view in FIG. 9 may therefore be regarded as representing the side elevation of either a pair of turbines as in FIG. 1 or a row of turbines as in FIG. 5.

Figure 10:
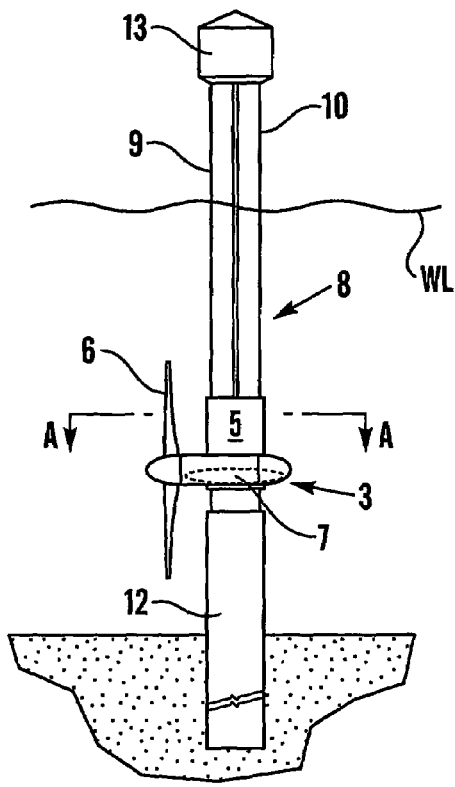
FIG. 10 is a side view of a first method by which turbine unit support assembly can to be raised and lowered along the upper part a support column.
Figure 12:
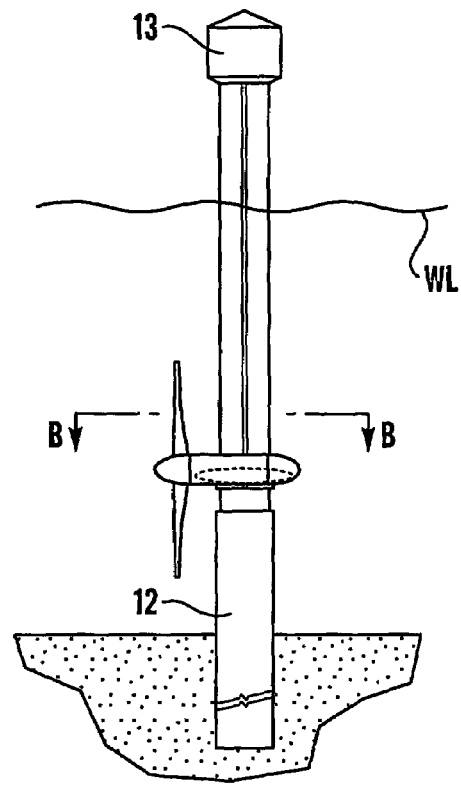
FIG. 12 is a side view of a second method by which a turbine unit support assembly can be raised or lowered along the upper part of a support column.
Figure 11:
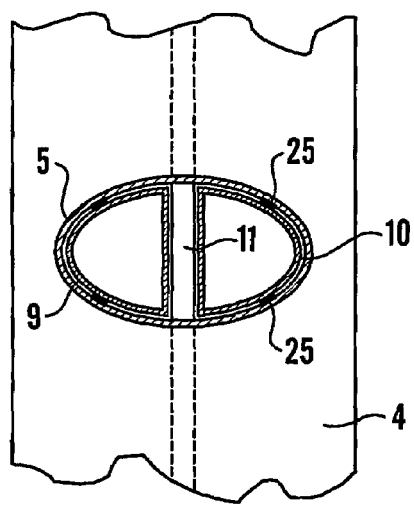
FIG. 11 a section on the line A-A of FIG. 10.

Referring to FIGS. 10 and 11, these Figures respectively illustrate methods by which the support structures 4 and 15 carrying the turbine assemblies 2 and 14 can be raised and lowered along the vertical height of the upper section 8 of the column. In the embodiment of FIG. 10 the collar/sleeve 5 fits closely enough around the column upper section 8 so as to be able to slide in a well guided manner up and down the oval/elliptical cross section formed by the combination of the column parts 9 and 10 of the upper section. As shown in the section of FIG. 12 (taken on the line A-A of FIG. 10) some vertical rubbing strakes 25 may be mounted to the surface of the column 1 or internally to the sleeve 5 to prevent the sleeve from having any substantial movement laterally of the column and to provide a low friction surface to guide the sleeve 5 when it is being raised or lowered with respect to the column parts 9 and 10. Contact with said rubbing strakes 25 may be either from the internal surface of the sleeve or with pads made from a suitable low friction material such as a filled nylon. These particular pads are not illustrated in the figure.

Figure 13:
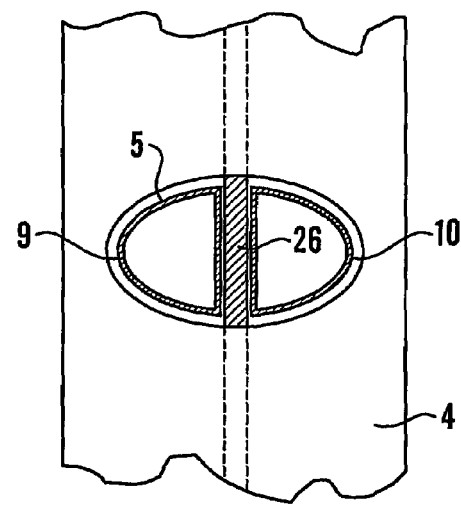
FIG. 13 is a section on the line B-B of FIG. 12.

Referring now to FIG. 13 this illustrates a further embodiment of arrangements for facilitating movement of the sleeve 5 lengthways of the column upper section 8. In this embodiment a cross head 26, consisting of a large rectangular member that is attached to the main spar of the structure 4 or 15 and is enclosed between the "D" shaped twin columns 9 and 10 forming the upper section 7 of the column 1. The cross-head 26 is an easy moveable fit in the space 11 between the columns 9 and 10 whereby if the cross head is moved vertically within the space 11 it is guided by the columns 9 and 10 themselves. In an embodiment using a cross head the use of the sleeve to guide the vertical movement lengthways of the support structure may in some constructions not be required since the support structures themselves attached either side of the crosshead 26 may prove sufficient to prevent lateral movement with respect to the column. The cross head 26 may be provided with low friction pads (not shown) to engage with the internal faces of the slot in the column such that friction is minimised and the cross head and the structures 4/15 cannot vibrate or move more than a small lateral distance with respect to the column. However, where a crosshead arrangement is used, a collar-like sleeve 5A will still need to be provided below the structure 4/15 to ensure there is a lower surface that can rest on the upper surface of base section 12 of the column when the structure 4/15 is at its lowest point of travel. FIG. 13 represents a cross section of the column, cross head and sleeve 5A on the line B-B of FIG. 11. The cross head is adapted for connection to a support structure lifting arrangement of which embodiments will be discussed hereinafter.

In the embodiments of the mounting of the turbine unit support assemblies so far described it is possible to arrange that the sleeve 5 can be effectively locked in place with respect to the column base section 12 to prevent vibration or movement when at its lowest point of travel. This is illustrated by reference to FIG. 14, wherein the lower edge 27 of the sleeve 5 has a slot or opening 28 in the shape of an inverted "V" which is able to engage with a solid similarly shaped key 29 attached to the upper surface 30 of the base section 12 of column 1. The position of the support structure 4/15 for carrying the turbine units 7 is indicated at 31.

FIG. 15 illustrates the arrangement of FIG. 14 when in its lowered locked position.

The arrangement described for locking the sleeve 5/5A can consist of more than one "key" and associated slot. In practice, it is considered that the weight of the assembly would be sufficient for the keys and slots to engage fixedly such that no small relative motion, rocking, or vibration can take place and the collar and structures 4/15 become effectively locked to the column until they are lifted to disengage the slots and keys combinations.

In installations where the sleeve may be required to be positioned at various heights, such as when it is required for the rotors to be raised for operation nearer the surface in locations with a high tidal range, it is convenient to be able to be able to lock the sleeve 5 to the column 1 through the use of hydraulically (or screw) activated plungers or pins (not shown) mounted on the sleeve 5 which can be arranged to press against or engage with the adjacent surface of the column 1. In practice such such devices would be activated by the control system provided for the control of the turbine units and associated power system.

It is desirable to minimise the thickness of the wing-like support structure 4/15, so that the previously mentioned drag and wake factors are also minimised as far as possible, because when operating in a bi-directional tidal regime, with the structure 4/15 upstream of the rotor, the rotor blades will cut through the wake from the structure 4/15. There is therefore a requirement to achieve the stiffness and strength needed for the structure 4/15 while also achieving the desired minimum thickness. A solution to this problem is shown in FIG. 16, where struts 40 are installed to brace the associated structure 4 against the sleeve 5 or cross-head 26. The struts 40 will also be of streamlined (elliptical) cross-section so that they do not create unnecessarily large wakes.

An important feature of the present invention is the ability to be able to raise and lower the turbine assemblies so that not only can they be operated at any desired depth in the water column but they can also be accessed for installation, maintenance, repairs and replacement from a position above the surface of the water. Therefore an important aspect of the proposals of the present invention is the provision of means to raise and lower the structures 4/15 carrying the turbine units 3, whether it is one or two turbine units on a single support column or a row of turbine units bridged between two (or more) support columns.

The following Figures illustrate embodiments of apparatus for raising and lowering the turbine assemblies including the support structures 4/15 and the associated turbine units 3 which latter may have a mass of several tens of tonnes (depending on the power rating) of the turbine units.

Figure 17:
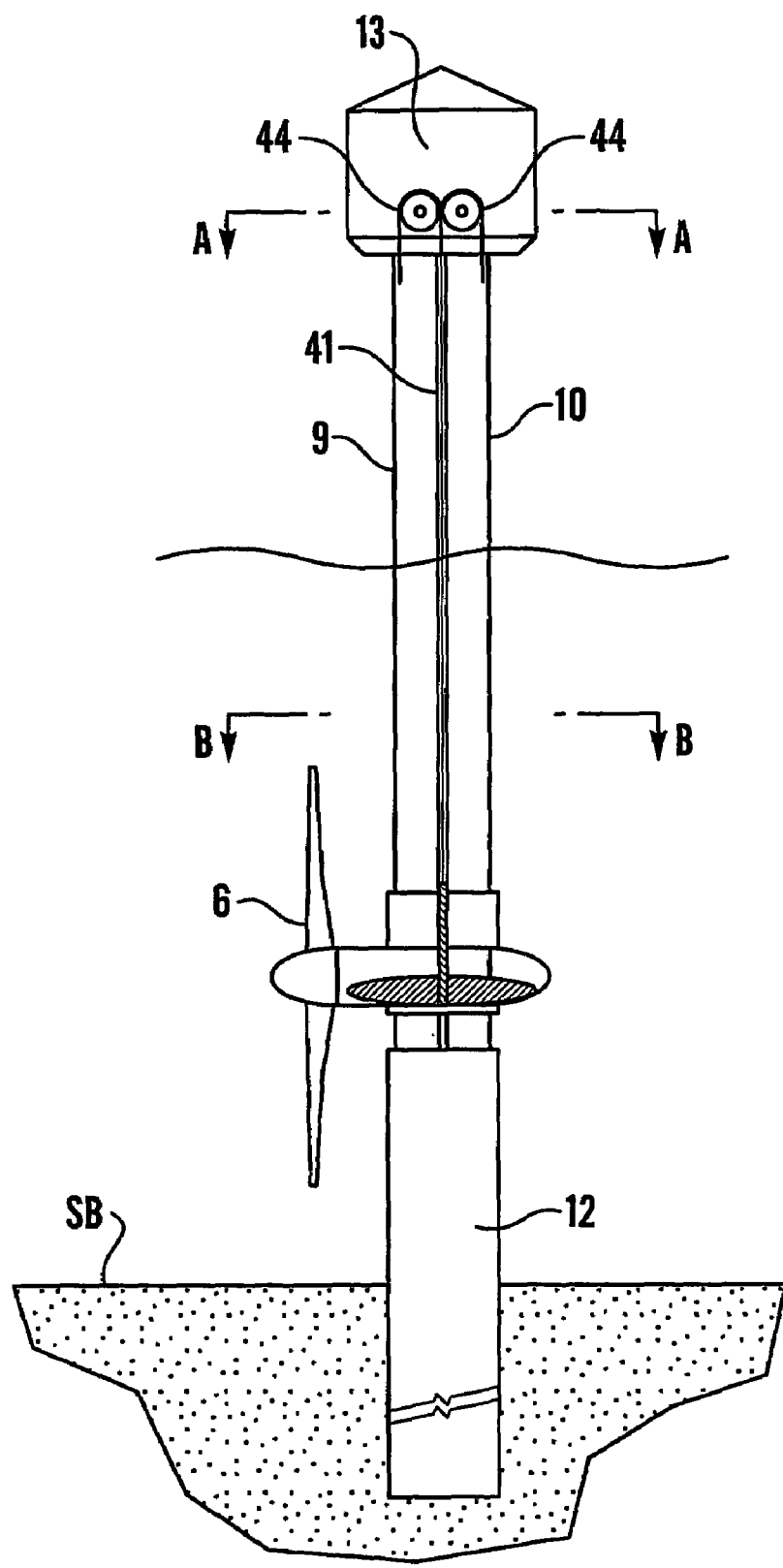
FIG. 17, schematically illustrates an embodiment of a lifting mechanism for the turbine unit support assembly.
Figure 18:
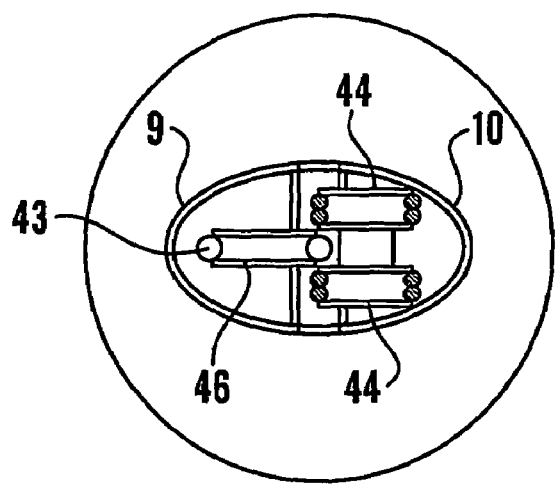
FIGS. 18 and 19 are respectively sections on the lines A-A and B-B of FIG. 17.
Figure 19:
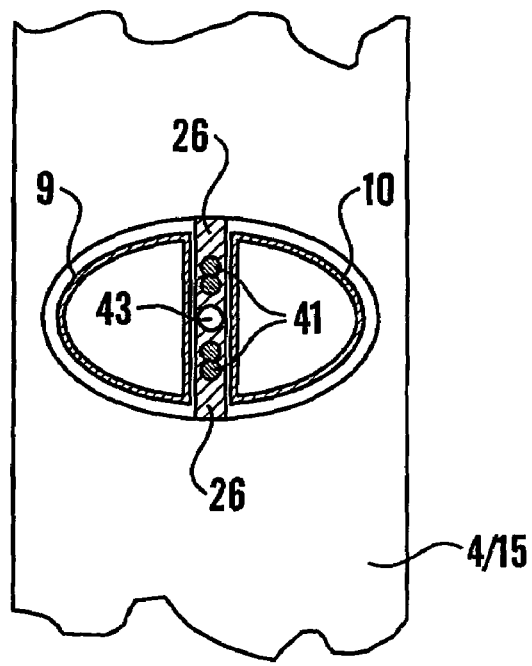

Referring to FIGS. 17 to 19 that illustrate a first embodiment of such apparatus. These Figures illustrate how the support structure 4/15 and the associated turbine units 3 are installed so that the main spar of the structure 4/15 in an arrangement involving a crosshead 26 passes through the gap 11 between the two "D" shaped cross section vertical part columns 9 and 10 of the upper section 8 of the column 1. Either the crosshead 26 or the sleeve 5 (or both options) is fitted with suitable rubbing strips or strakes and low friction guide pads (not illustrated here but described earlier) act as to guide the support structure 4/15 and associated turbine or turbine units 3 as it rises up the upper section of the column.

FIG. 17 shows how this assembly could be raised by using cables or chains 41 attached to the main spar or to the crosshead (which would in turn be attached to the main spar of the structure 4/15). In the FIGS. 18 and 19, the latter being enlarged sectional view section on the lines A-A and B-B of FIG. 17 the black circles 42 represent the cross section through the cables or chains 41—four such cables are used for illustration in FIG. 19 but more or fewer cables or chains may be used in practice. Electrical power and instrumentation cables together with any hydraulic or pneumatic hoses necessary for servicing the power units are taken up the centre of the upper section of the column between the lifting cables or chains, and are indicated in cross section by the white circle. As shown in FIG. 18 the cables 43 engage with appropriate pulleys and or winch drums 44

The elevation view in of FIG. 17 schematically indicates the cable guide pulleys/winches 44 located in the housing 13 located at the top section 8 of the column 1 and at a position clear of the highest water and wave level. These pulleys/winches 45 are arranged in such a way that either the cables and chains 43 are rolled up onto winch drums (not separately shown) when the system is raised or alternatively, and especially where chains are used, the cable/chains pass over the winch pulleys (being engaged by the pulley using teeth or some form of friction grip to prevent slippage which is not illustrated) and as they are lifted up the central gap 11 of the upper section 8 of a column 1 the loose ends of the chains are allowed to descend down the interior of the "D" shaped columns 9 and 10. The electrical cables can either be disconnected. Alternatively a loop of extra cable (not illustrated) can be provided to enable stowage of the upper part of the cable in the housing 13 or in the upper section of the columns 9 and 10 when the support structure 4/15 is raised. FIG. 19 illustrates how the lifting winches 44 can be disposed in order to achieve the desired goal of the turbine assembly 2 or 14 being lifted by paired outer cables or chains while also picking up and storing a loop or the ends of all the power and service cables and connections. It will be appreciated that twin winch pulleys or drums are required for the lifting cables or chains but a single pulley or drum can handle the cables and service connections.

The type of lifting cable or chains used can be wire ropes but a preferred arrangement will be to use chains with links such that there is full flexibility only in the plane of the winch drum, and limited lateral flexibility, much like a bicycle chain or the tracks of a crawler vehicle which wrap readily around their sprockets but which do not bend laterally. Such links can be designed to engage with teeth or suitably shaped irregularities in the winch drums or indeed suitable sprockets may be substituted for the drums, so that the load can be carried by wrapping the lifting chain around less than the circumference of the drum or sprocket. Alternatively if ropes are used they may be wrapped several times around the drum to ensure sufficient friction to lift the load and the loose end can still be allowed to drop down the inside of the gap 11 of the vertical column. This would be to minimise the overall diameter of the winch drum which would be needed if the entire cable or chain is to be wrapped around the drum. Clearly whatever ropes or chains are used will need to be compatible with water, and with sea water in marine applications.

It should be noted that the lifting cables, ropes or chains 41 are relatively protected from water flow action and/or from entanglement with foreign bodies such as floating debris through being located in the gap 11 between the vertical columns 9 and 10 and the more sensitive and easily damaged cables plus any hydraulic or pneumatic hoses 43 are further protected by being located between the lifting cables of chains 41. The open gap 11 shown in the FIG. 18 may also be partially closed with protective flexible rubber panels (not shown), which can be forced apart when the wing structure 4 or 15 is raised, especially in the region near the surface of the water, so that debris and wave action are more effectively excluded from the space 11 between the upper pile columns.

Figure 20:
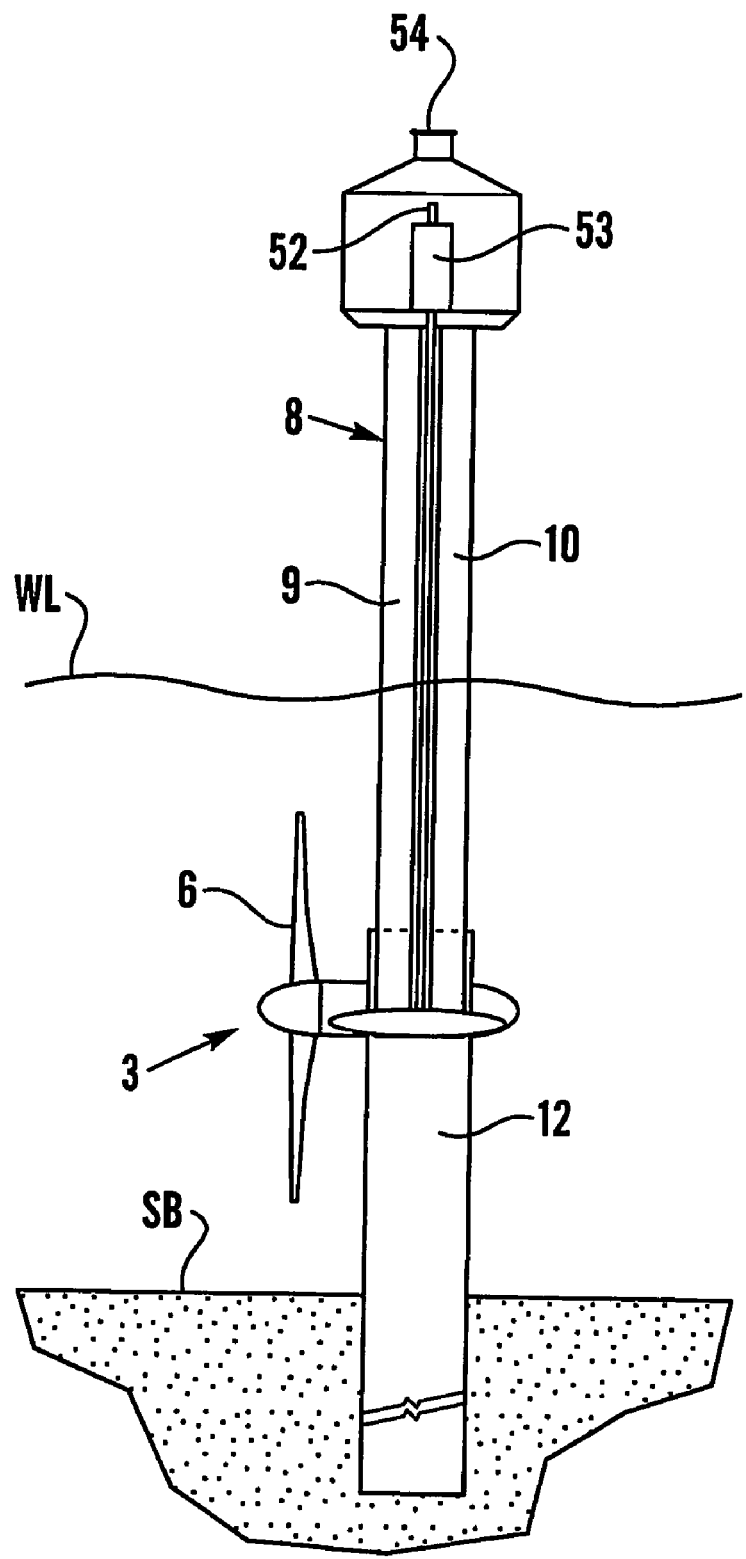
FIG. 20 schematically illustrates a second embodiment of a lifting mechanism for the turbine unit support assembly when in its turbine unit operational position.
Figure 21:
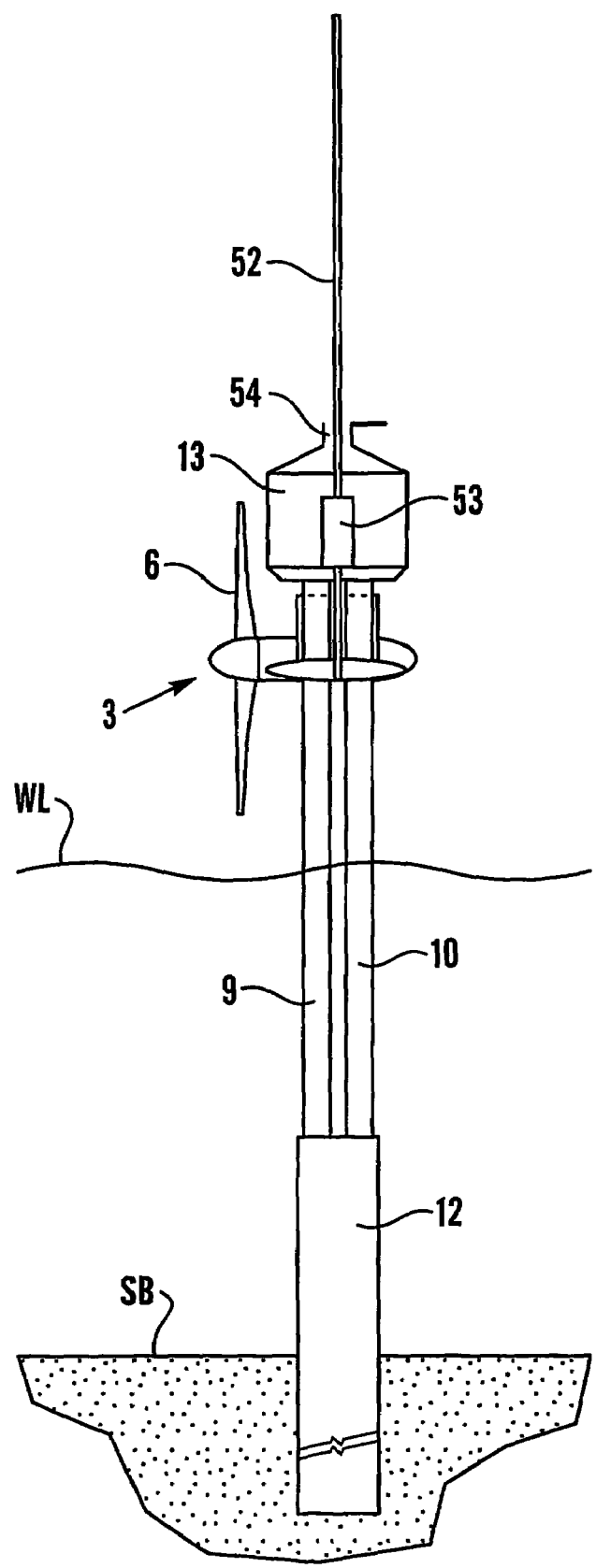
FIG. 21 schematically illustrates the embodiment of FIG. 20 when the turbine unit support assembly is raised above water level.

FIGS. 20 and 21 schematically illustrates an alternative method for lifting the turbine assembly 2 or 14. This alternative method indicates how, instead of ropes or chains, a rigid vertical leg or strut 52 is attached to the associated unit turbine assembly 2.14 at a point near to the central axis of the column 1 in the gap 11 between two "D" cross-section vertical columns 9 and 10. This vertical strut 52 projects from its attachment position at the the centre of the wing structure 4 or 15 vertically between the columns 9 and 10 and into the housing 13 on top of the column. A lifting device 53 which may consist of a number of different options to be described later, engages with the vertical strut 52 and can be used to draw it vertically upwards until the entire strut with the attached turbine assembly 2 or 14 are clearly above the water level as is indicated in FIG. 21. An opening 54 is provided in the top of the housing 13 to enable the strut 52 to emerge from the housing 13 through the opening 54 which latter is normally covered with a weatherproof lid at times when the turbine unit support assembly is system is lowered and the strut 52 is within the housing.

The electrical power cables, control and instrumentation cables plus any hydraulic or pneumatic hoses can be threaded through the vertical strut 52 and will normally emerge from the top of the strut 52 into the housing 13 at the top of the column. Before raising the strut and the attached structures 4 or 15 all the connections from the cables, hoses etc., emerging from top of the strut 52 into the housing 13 may be disconnected using suitable electrical (and if appropriate hydraulic or pneumatic) connectors.

As mentioned the lifting device 53 can comprise various possible options. One possibility is for the vertical strut 52 or column to have a flange fixed along its outer length with teeth or holes in it which can be engaged in the manner of like a rack and pinion by an electrical or hydraulic rotary drive unit (not shown). Another option is to use hydraulic rams and locking pins to raise the strut on a step by step basis like the leg of some jack-up barges; this technique involves a hydraulic ram being manually engaged (by an operator) with a suitable peg or a hole in a longitudinal flange attached to the strut—the hydraulic ram is pressurised to extend and lift the strut by the length of its throw—the strut is then pinned or in a suitable manner is clamped so it cannot drop, while the hydraulic ram is disengaged, contracted and then re-engaged with another lower peg or hole and the cycle is repeated until sufficient overall lift has been achieved in a series of steps. In some cases the locking may be achieved and wholly or partially automated by using inflatable rubber grippers that surround a smooth cylindrical tubular strut, where a gripper is attached to one or more hydraulic jacks and another gripper is attached to the structure.

Figure 22:
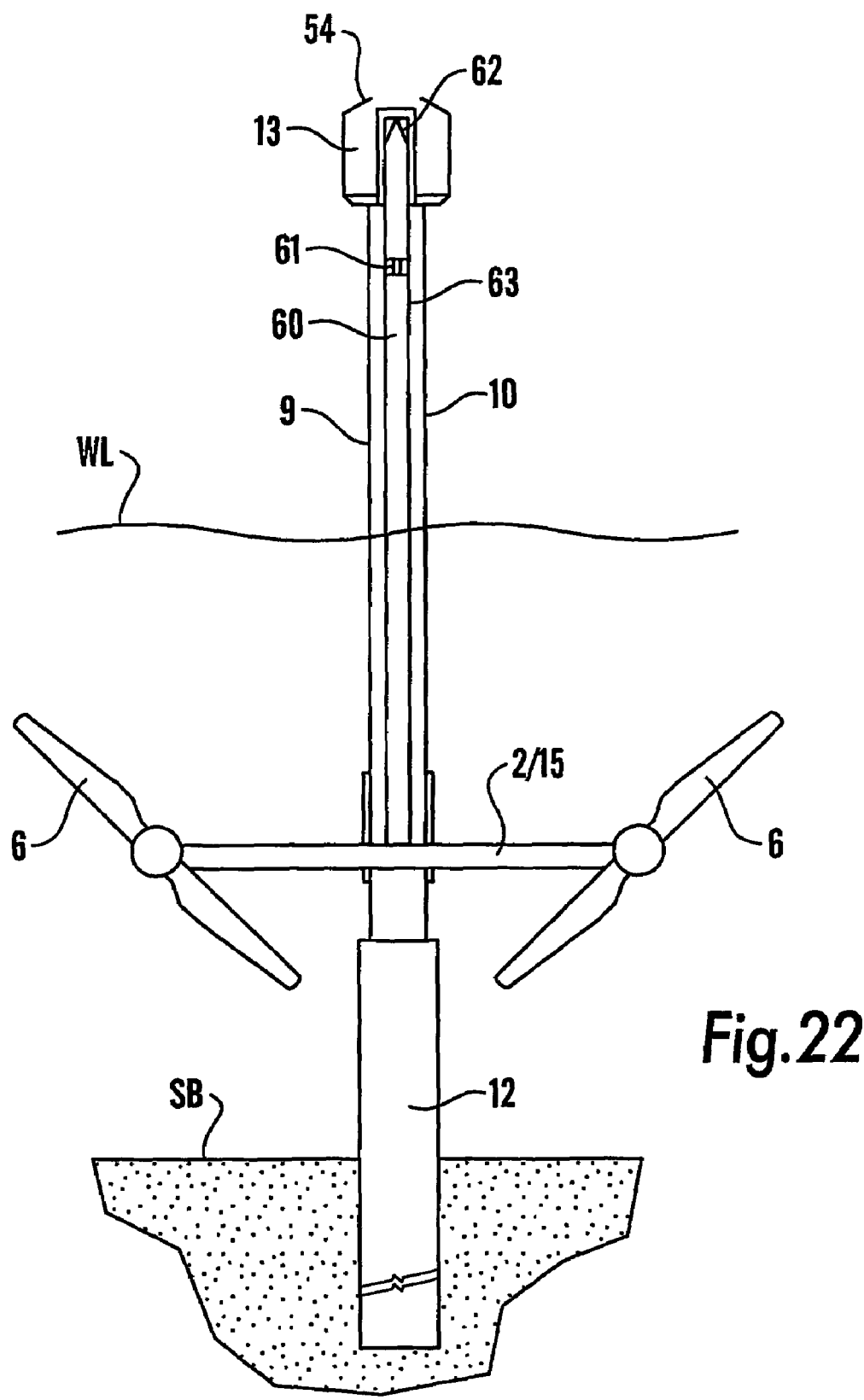
FIG. 22 schematically illustrates a third embodiment of a lifting mechanism for the turbine unit support assembly when in its turbine operational position.
Figure 23:
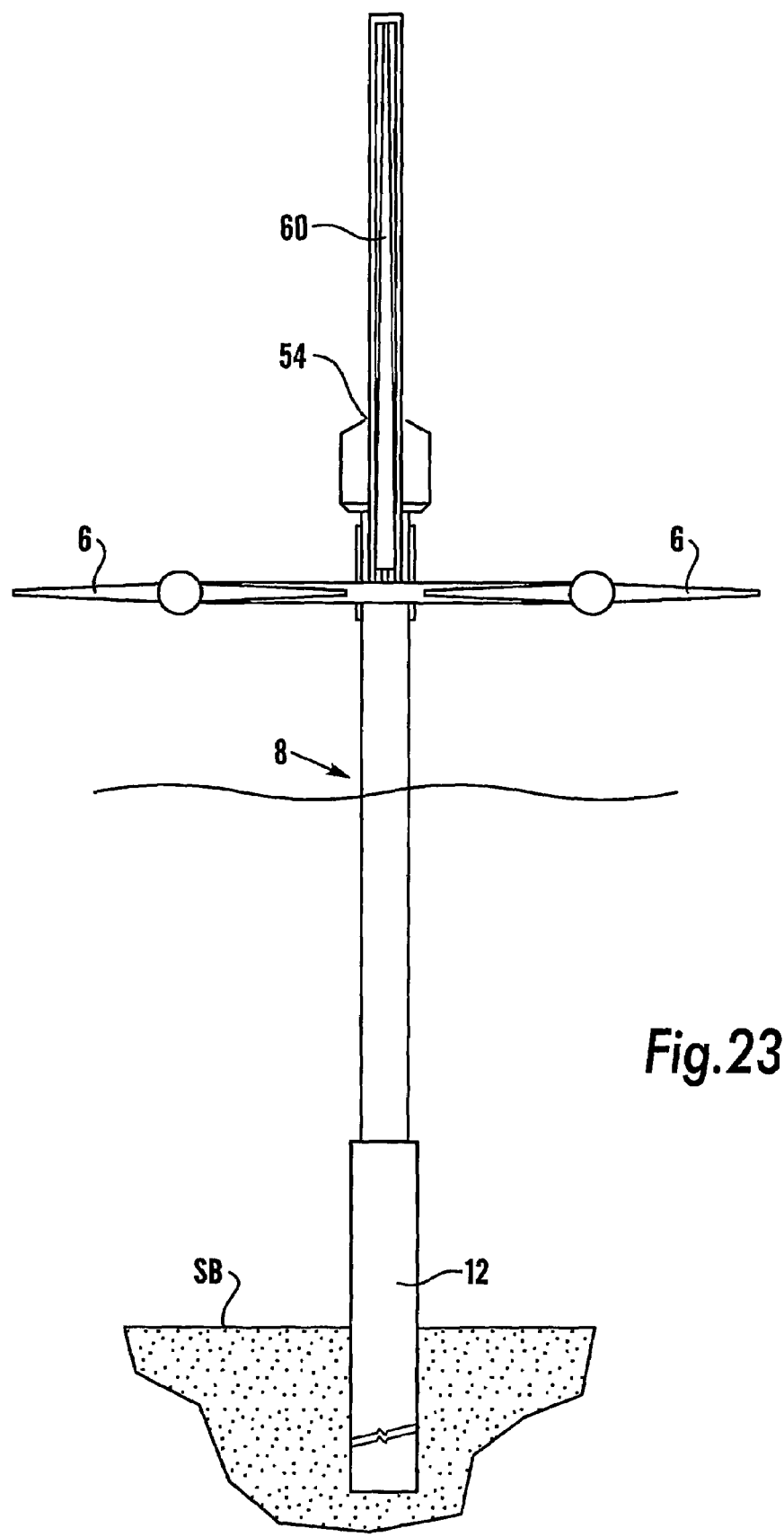
FIG. 23 schematically illustrates the embodiment of FIG. 22 when the turbine unit support assembly is raised above water level.

It is also possible to raise or lower the turbine units using a multiple staged hydraulic ram (or rams) system is shown in FIGS. 22 and 23 in which a hydraulic ram or rams 60 supported on a beam 61 and engage(s) with and can raise or lower a yoke 62 that in turn can pull up the associated turbine assembly 2 or 14 using paired pull rods 63 passing either side of the hydraulic ram(s) 60 but within the space 11 between the upper section of the columns. The overall stroke of the hydraulic ram or rams needs to be sufficient to equal the necessary height to be lifted; this may be achieved by a single multi-stage ram as shown in the Figures or by several hydraulic rams connected in series. When extended to lift the turbine units and structure 4/15, the hydraulic ram(s), yoke and pull rods extend through a hole 54 in the roof of the housing 13 on top of the column and project above the column as shown.

Figure 24:
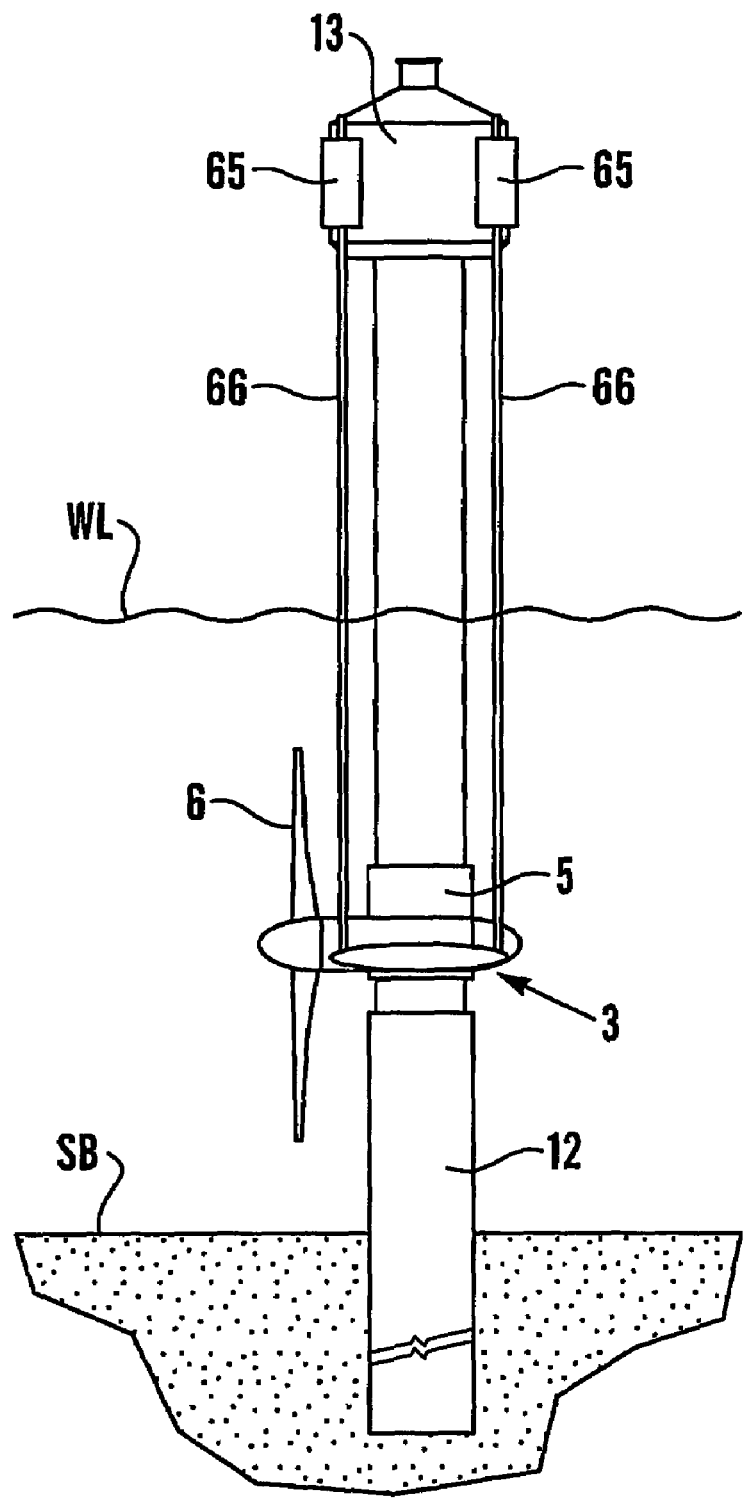
FIG. 24 schematically illustrates a further embodiment of a lifting mechanism for the turbine unit support assembly when in its turbine operational position.
Figure 25:
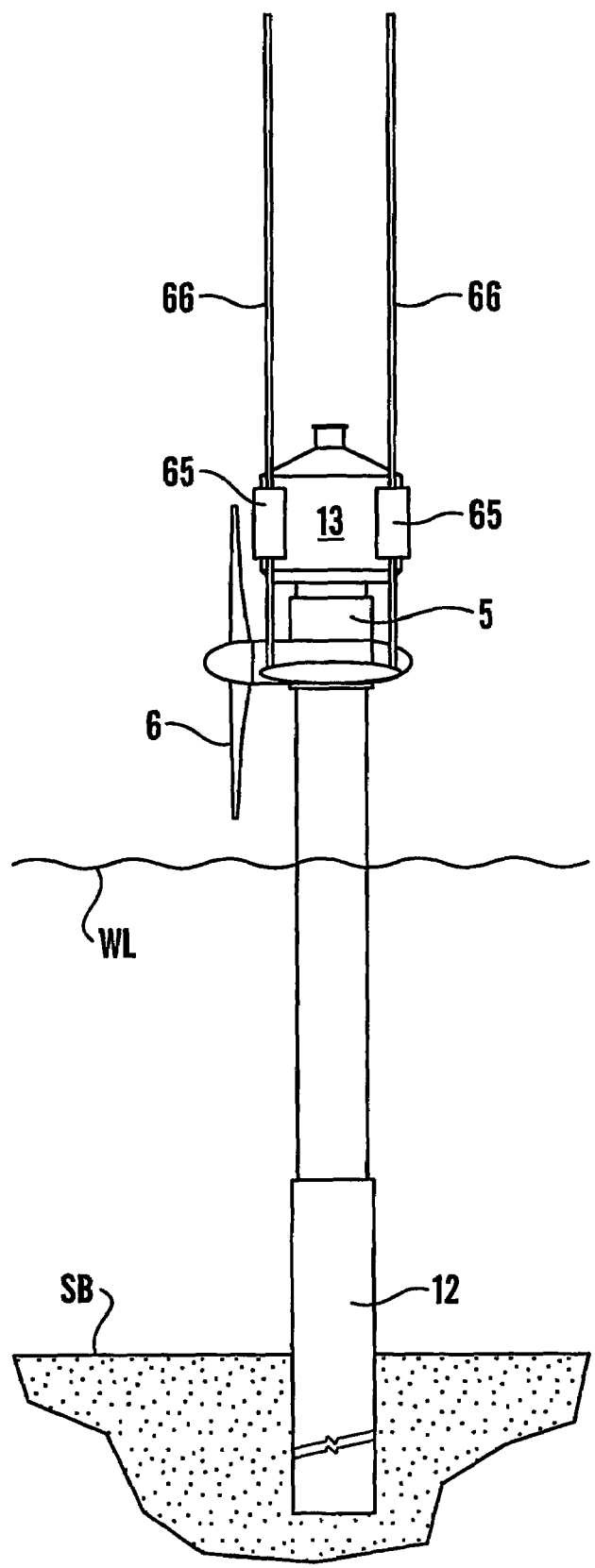
FIG. 25 schematically illustrates the embodiment of FIG. 24 when the turbine unit support assembly is raised above water level.

So far all the variations described have involved the upper section of the column comprising two vertical part columns 9 and 10 with a gap 11 between them which encloses the lifting members. However in some embodiments of a column construction it may be preferred to have the upper section 8 as one piece column. In this situation the lifting members need to be external to the column. Such a variation is shown in FIGS. 24 and 25 where the upper section of the column 1) is surrounded by a sleeve/collar carrying turbine assembly 2 with a pair of turbines and rotors one at at each extremity In the example as shown, hydraulic (or other) lifting devices 65 interact and draw upwards lifting members 66 disposed on either side of the upper section of the column. These lifting members 66 are attached to the sleeve 8 and hence when raised they cause the sleeve 5 plus assembly 2 connected thereto to be raised above the level of the water as shown in FIG. 25. In this case it is assumed the lifting members are rigid members rather than ropes or chains so they project vertically above the lifting devices when raised.

It should be noted that although at least two pull members disposed on opposite sides of the upper section of the column to each other are needed (as illustrated) t it may be preferred to use more than two such members deployed around the circumference of the collar.

In the configuration illustrated in FIGS. 24 and 25, the lifting members 66 and would be disposed in alignment with the flow of water, that is immediately upstream and downstream of the column, so as to minimise disturbance of the flow of water and adverse drag and wake conditions around the upper part of the column 1 that would occur with laterally disposed lifting members.

In practice said vertically pulled lifting members 66 may be lifted by any appropriate means; such as hydraulic rams, rack and pinion or the pulled members may be flexible such as cables or chains in which case they may be pulled by winches or pulley systems energised either electrically or hydraulically.

During the installation of the above described columns 1 the production of a hole in the seabed SB to take the column is drilled it may be necessary to allow a sleeve to follow the drill into the hole in order to prevent the sides of the hole from caving in. In practice the said sleeve needs to project a small amount above the surface of the seabed SB when the drilling is completed to provide protection from the water washing debris into the hole before the column can be inserted. In practice in some circumstance the sleeve can be arranged to follow the drill and thus effectively fall into the hole. In other situations it may be necessary for the hole to be under-reamed by a larger drill head. Alternatively the sleeve may need to be driven into position by providing an internal flange securely welded at its lower end which is used by a pile driving hammer (bottom driving) to drive the sleeve into place.

In the case of the actual construction of the columns it has been found that the columns can best be fabricated in sections rolled from standard steel plates and butt-welded together. In practice these column forming sections will be of the same outside diameter but of differing wall thickness to accommodate the effects of bending forces at different heights of the column when installed. For example, the wall thickness will be greatest in and near the seabed and less at higher levels of the pile.

The sleeve 5 used for mounting the turbine assemblies 2 and 14 including the turbine unit(s) 3 and drive train(s) and can be guided relative to the column by having carriers with low friction, non-corrodable pads made from bearing materials such as filled nylon which can slide on non-corrodable longitudinal rubbing surfaces fixed along the outside of the column—these can for example be stainless steel angle stitch welded to the column.

Whilst various arrangements for displacing the sleeve and associated turbine assembles lengthways of the columns have been described a further arrangement can involve a lifting leg such that it has engageable holes or teeth that may be gripped by a hydraulically driven collar which can have pins inserted to grip, or removed to permit relative movement. When the gripper (not shown) is engaged with a pin to the lifting leg, it can be raised by activating a hydraulic ram. When the hydraulic ram is fully extended the leg can be pinned to a fixed structural component to hold it in place while the hydraulic ram and gripper are disengaged and retracted ready to be re-attached at a lower point on the leg. Once re-attached the pin to the fixed structural component can be removed so the hydraulic ram again carries the weight of the lifting leg and can lift it by a further full stroke. The lowering process is similar bit in reverse.

In a further arrangement (not shown) in the Figures a rack can be attached to the lifting leg which can be engaged by a pinion located at the top of the pile and driven by a geared motor (from either an electrical or hydraulic power source). Said pinion will need to be positively held into engagement with the rack by a structure which rubs or rolls along the reverse side of the rack; alternatively a double sided rack driven by twin pinions on parallel shafts may be used as the two pinions will hold each other in engagement.

The invention claimed is:

1. A support system for a marine turbine installation comprising a vertical support column, a horizontal turbine support structure, and at least two turbine units operationally carried by the horizontal turbine support structure, an upper portion of the vertical support column including a vertically extending gap bifurcating the support column upper portion into two generally D-shaped partial columns, a portion of the horizontal turbine support structure extending through the vertically extending gap, and displacing means for selectively vertically displacing the horizontal turbine support structure with respect to the vertical support column.

2. A support system for a marine turbine installation comprising a vertical support column, a horizontal turbine support structure, and at least two turbine units operationally carried by the horizontal turbine support structure, a sleeve surrounding the column and coupled to the horizontal turbine support structure for movement with the horizontal turbine support structure relative to the vertical support column, displacing means for selectively vertically displacing the horizontal turbine support structure with respect to the vertical support column, the displacing means includes locking means for locking the horizontal turbine support structure at selected positions relative to the vertical support column, the locking means including a projection and complementary recess for preventing rotational displacement of the horizontal turbine support structure relative to the vertical support column.

3. The support system of claim 1 wherein the displacing means comprises flexible tension members connected to the horizontal turbine support structure within the gap, and pulleys or winches situated adjacent an upper end of the vertical support column and engaging the flexible tension members.

4. The support system of claim 1 wherein the displacing means comprises rigid tension members connected to the horizontal turbine support structure adjacent to the gap, and drive arrangements coupled to an upper end of the vertical support column and to the rigid tension members.

5. The support system of claim 3 or 4 further comprising electrical power and instrumentation cables situated in the gap that are connected to the turbine units.

6. The support system of claim 1 wherein a portion of the horizontal turbine support structure within the gap includes friction reducing surfaces facilitating vertical displacement of the horizontal turbine support structure relative to the support column.

7. The support system of claim 1 further comprising a sleeve surrounding the column and coupled to the horizontal turbine support structure for movement with the horizontal turbine support structure relative to the vertical support column.

8. The support system of claim 2 or 6 further comprising diagonal struts coupling the sleeve to the horizontal turbine support structure.

9. The support system of claim 1 or 2 wherein the horizontal turbine support structure includes profiled leading and trailing edges minimizing the development of water drag and wake formation by water passing across the support structure.

10. The support system of claim 1 or 2 wherein the turbines include rotors that interact with water passing the turbines, the horizontal spacing of the turbines on the horizontal support structure being sufficient to space the rotors of adjacent turbine units from each other.

11. The support system of claim 10 wherein the spacing of the turbines is at least equal to the diameter of one of the rotors plus twice the vertical support column width.

12. The support system of claim 1 or 2 comprising at least two of said vertical support columns, the horizontal turbine support structure having a length more than sufficient to extend continuously between two adjacent vertical support columns.

13. The support system of claim 12 wherein the turbines are located on the horizontal turbine support structure so that at least one turbine is located between adjacent vertical support columns, and additional turbines are located on the opposite side of the vertical support columns from said at least one turbine.

14. The support system of claim 13 wherein the spacing of the turbines is at least equal to the diameter of one of the turbine rotors plus twice the vertical support column width.

15. The support system of claim 12 further comprising bridging means coupling the upper ends of adjacent support columns together.

16. The support system of claim 1 wherein the displacing means includes locking means for locking the horizontal turbine support structure at selected positions relative to the vertical support column.

17. The support system of claim 1 or 2 wherein a lower end of the vertical support column is fixed in a seabed, and the upper portion of the vertical support column extends sufficiently upward to permit withdrawal of the horizontal turban support structure and turbans from any water located above the seabed.

18. The support system of claim 17 further comprising diagonal bracing coupled to an upper region of the column and extending diagonally downward to an anchoring point for enhancing the stability of the vertical support column.

* * * * *